(12) United States Patent
Bierjon

(10) Patent No.: US 7,909,391 B2
(45) Date of Patent: Mar. 22, 2011

(54) MOTOR VEHICLE FRONT-END PANEL, SERIES OF FRONT-END PANELS AND ASSEMBLY METHOD

(75) Inventor: Didier Bierjon, Audincourt (FR)

(73) Assignee: Faurecia Bloc Avant, Nanterre (FR)

( * ) Notice: Subject to any disclaimer, the term of this patent is extended or adjusted under 35 U.S.C. 154(b) by 91 days.

(21) Appl. No.: 12/442,621

(22) PCT Filed: Sep. 19, 2007

(86) PCT No.: PCT/FR2007/001524
§ 371 (c)(1),
(2), (4) Date: Mar. 24, 2009

(87) PCT Pub. No.: WO2008/037873
PCT Pub. Date: Apr. 3, 2008

(65) Prior Publication Data
US 2010/0026049 A1   Feb. 4, 2010

(30) Foreign Application Priority Data

Sep. 25, 2006   (FR) ..................................... 06 08401

(51) Int. Cl.
*B60J 7/00* (2006.01)
(52) U.S. Cl. .............. 296/193.09; 296/203.02; 180/68.4
(58) Field of Classification Search ................. 296/194, 296/203.02, 193.09; 180/68.4, 68.1
See application file for complete search history.

(56) References Cited

U.S. PATENT DOCUMENTS

| | | | | |
|---|---|---|---|---|
| 5,106,148 A | * | 4/1992 | Ikeda et al. | 296/203.02 |
| 5,533,780 A | * | 7/1996 | Larson et al. | 296/203.02 |
| 5,658,041 A | * | 8/1997 | Girardot et al. | 296/193.09 |
| 6,450,276 B1 | | 9/2002 | Latcau | |
| 7,419,208 B2 | * | 9/2008 | Sub | 296/193.09 |

FOREIGN PATENT DOCUMENTS

| | | |
|---|---|---|
| EP | 1 072 501 | 1/2001 |
| FR | 2 833 559 | 6/2003 |

OTHER PUBLICATIONS

International Search Report dated Mar. 28, 2008, from corresponding PCT application.

* cited by examiner

*Primary Examiner* — Joseph D. Pape
(74) *Attorney, Agent, or Firm* — Young & Thompson

(57) ABSTRACT

This front-end panel (10) includes an upper transverse cross member (18) to be fixed to body elements (12) and a frame (20). The frame (20) is fixed beneath the cross member (18) and includes a lower transverse beam (50) and two side-struts (52) connecting the lower beam (50) to the cross member (18). Each strut (52) includes a lower portion (54) which is integral with the beam (50), and an upper portion (56) which is integral with the cross-member (18). The upper portion (56) and the lower portion (54) are mobile relative to one another between a disassembled configuration in which the upper portion (56) is arranged at a distance from the lower portion (54), and an assembled configuration in which the upper portion (56) and the lower portion (54) are fitted together.

20 Claims, 3 Drawing Sheets

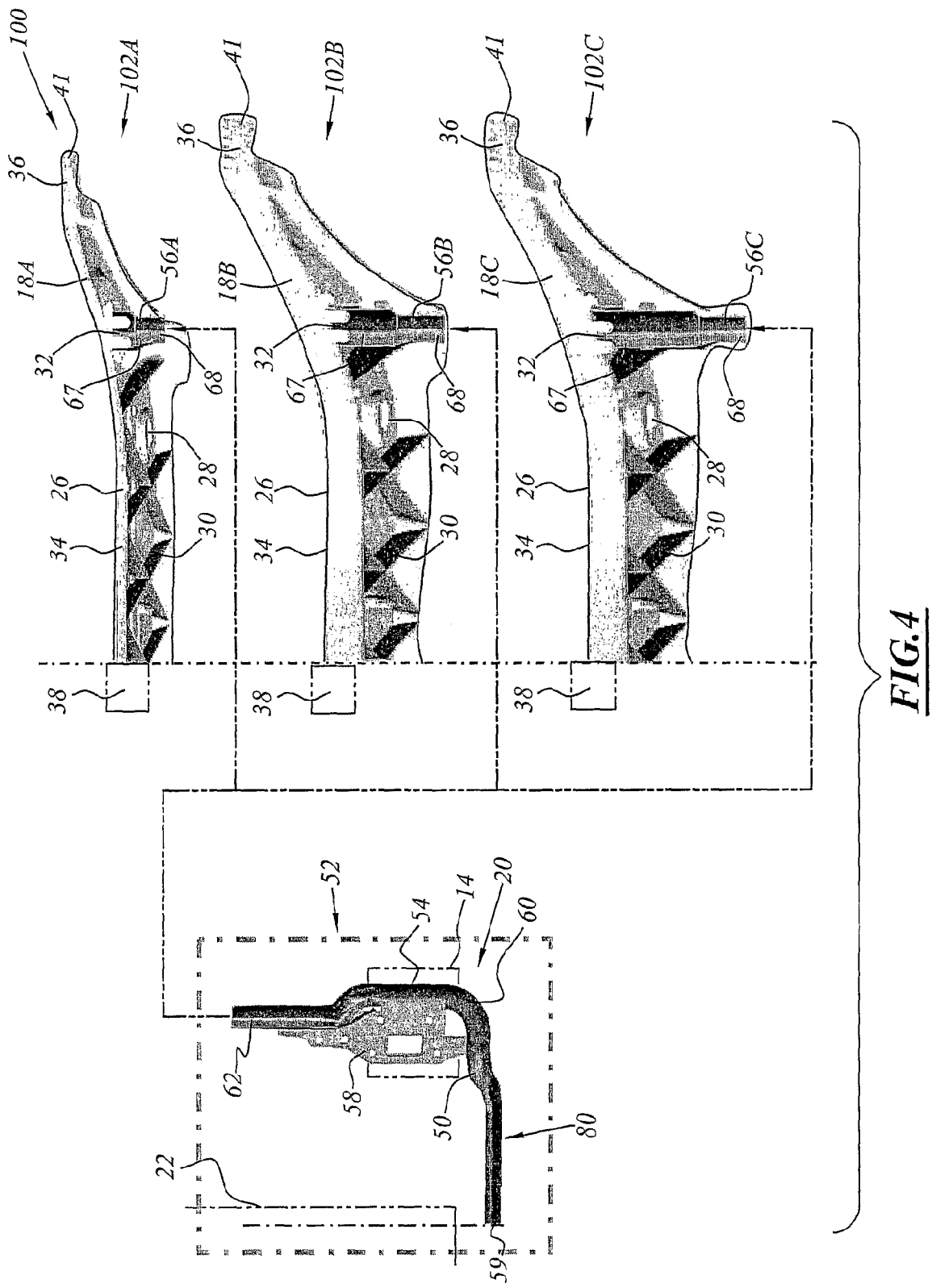

MOTOR VEHICLE FRONT-END PANEL, SERIES OF FRONT-END PANELS AND ASSEMBLY METHOD

FIELD OF THE INVENTION

The present invention relates to a motor vehicle front-end panel of the type comprising:
- an upper transverse cross member to be fixed to body elements of the vehicle;
- a frame, the frame being fixed beneath the cross member and comprising a lower transverse beam and two side struts connecting the lower beam to the cross member.

BACKGROUND OF THE INVENTION

Front-end panels of this type constitute transverse structural elements for housing various vehicle equipment, such as a heat exchanger, a motor-driven fan, headlights, indicator lights or/and a bonnet lock.

A front-end panel of the aforementioned type is known from FR-A-2 833 559. A front-end panel of this type is assembled together with its equipment by an equipment manufacturer and is then supplied to a car manufacturer so as to be assembled on body elements at the front of the vehicle. The shape of the front-end panel depends on the structure of the vehicle and the general shape of the car body.

A front-end panel of this type is not entirely satisfactory. In fact, in order to reduce costs, car manufacturers are increasingly using the same vehicle platform, on which car bodies of differing shapes and heights are assembled. A specific front-end panel must thus be developed and produced for each type of vehicle assembled using the same platform, which increases costs.

OBJECT OF THE INVENTION

An object of the invention is to provide, at a reduced cost, a front-end panel which houses equipment for vehicles of the same platform but which still has a good level of structural rigidity.

SUMMARY OF THE INVENTION

The invention thus relates to a front end-panel of the aforementioned type, in which each strut comprises a lower portion which is integral with the beam, and an upper portion which is integral with the cross member, the upper portion and the lower portion being mobile relative to one another between a disassembled configuration in which the upper portion is arranged at a distance from the lower portion and an assembled configuration in which the upper portion and the lower portion are fitted together.

The front-end panel according to the invention may have one or more of the following features, taken in isolation or in any technically feasible combination:
- the lower portion and the upper portion are each made from a tubular element;
- the lower beam is made from the same tubular element as the lower portion, said tubular element being bent between the lower beam and the lower portion;
- the mean horizontal cross-section of the lower portion is substantially equal to the mean horizontal cross-section of the upper portion;
- the upper portion is fixed and enclosed in the upper cross member;
- it comprises a fixing element inserted through the upper portion and the upper cross member; and
- the upper cross member carries at least one element for locking a bonnet.

The invention also relates to a series of motor vehicle front-end panels, each front-end panel being of the type comprising:
- an upper transverse cross member to be fixed to body elements of the vehicle;
- a frame, the frame being fixed beneath the cross member and comprising a lower transverse beam and two side struts connecting the lower beam to the cross member, in which the series comprises:
- at least a first front-end panel in which each strut comprises a lower portion which is integral with the beam, and an upper portion which is integral with the cross member, the upper portion and the lower portion being mobile relative to one another between a disassembled configuration in which the upper portion is arranged at a distance from the lower portion, and an assembled configuration in which the upper portion and the lower portion are fitted together;
- at least a second front-end panel comprising a lower beam and a lower portion of a strut constructed identically to the lower beam and the lower portion respectively of a strut of the or each first front-end panel, the or each second front-end panel comprising a strut which is shorter than the height of the strut of the or each first front-end panel.

The series of front-end panels according to the invention may have one or more of the following features, taken in isolation or in any technically feasible combination:
- the upper cross member of the or each second front-end panel is fixed directly to the lower portion so as to form a strut which is shorter than the height of the strut of the or each first front-end panel; and
- the or each second front-end panel comprises an upper portion which is integral with the cross member, the upper portion and the lower portion being mobile relative to one another between a disassembled configuration in which the upper portion is arranged at a distance from the lower portion, and an assembled configuration in which the upper portion and the lower portion are fitted together, the height of the upper portion of the strut of the or each second front-end panel being different to the height of the upper portion of the strut of the or each first front-end panel.

The invention also relates to a method for assembling a series of motor vehicle front-end panels, each front-end panel being of the type comprising:
- an upper transverse cross member to be fixed to body elements of the vehicle;
- a frame, the frame being fixed beneath the cross member and comprising a lower transverse beam and two side struts connecting the lower beam to the cross member, wherein the method comprises the following steps;
- providing a plurality of identical lower frameworks, each framework comprising a lower beam and a lower portion of a strut which is integral with the lower beam;
- assembling at least a first front-end panel which comprises providing and displacing an upper portion of a strut relative to the lower portion of one of the identical frameworks between a disassembled configuration in which the upper portion is arranged at a distance from the lower portion, and an assembled configuration in which the upper portion and the lower portion are fitted together, and which also comprises fixing the upper portion to the cross member;

assembling at least a second front-end panel which comprises using one of the identical lower frameworks to form a strut which is shorter than the height of the strut of the or each first front-end panel.

BRIEF DESCRIPTION OF THE DRAWINGS

The invention will be better understood upon reading the following description, which is given solely by way of example and with reference to the accompanying drawings, in which:

FIG. 3 is a view similar to FIG. 1 of a second group of front-end panels of a series of front-end panels according to the invention, the series comprising a first group of front-end panels identical to that shown in FIG. 1; and FIG. 4 is a front schematic view of a second series of front-end panels according to the invention.

DETAILED DESCRIPTION OF THE INVENTION

Any references in relation to position hereinafter are those used conventionally with regard to a motor vehicle. The terms "front", "rear", "upper", "lower", "transverse", "longitudinal", "horizontal", "vertical", "left" and "right" are thus to be understood relative to the conventional direction of movement of a motor vehicle and the position of the driver.

Figure 1:
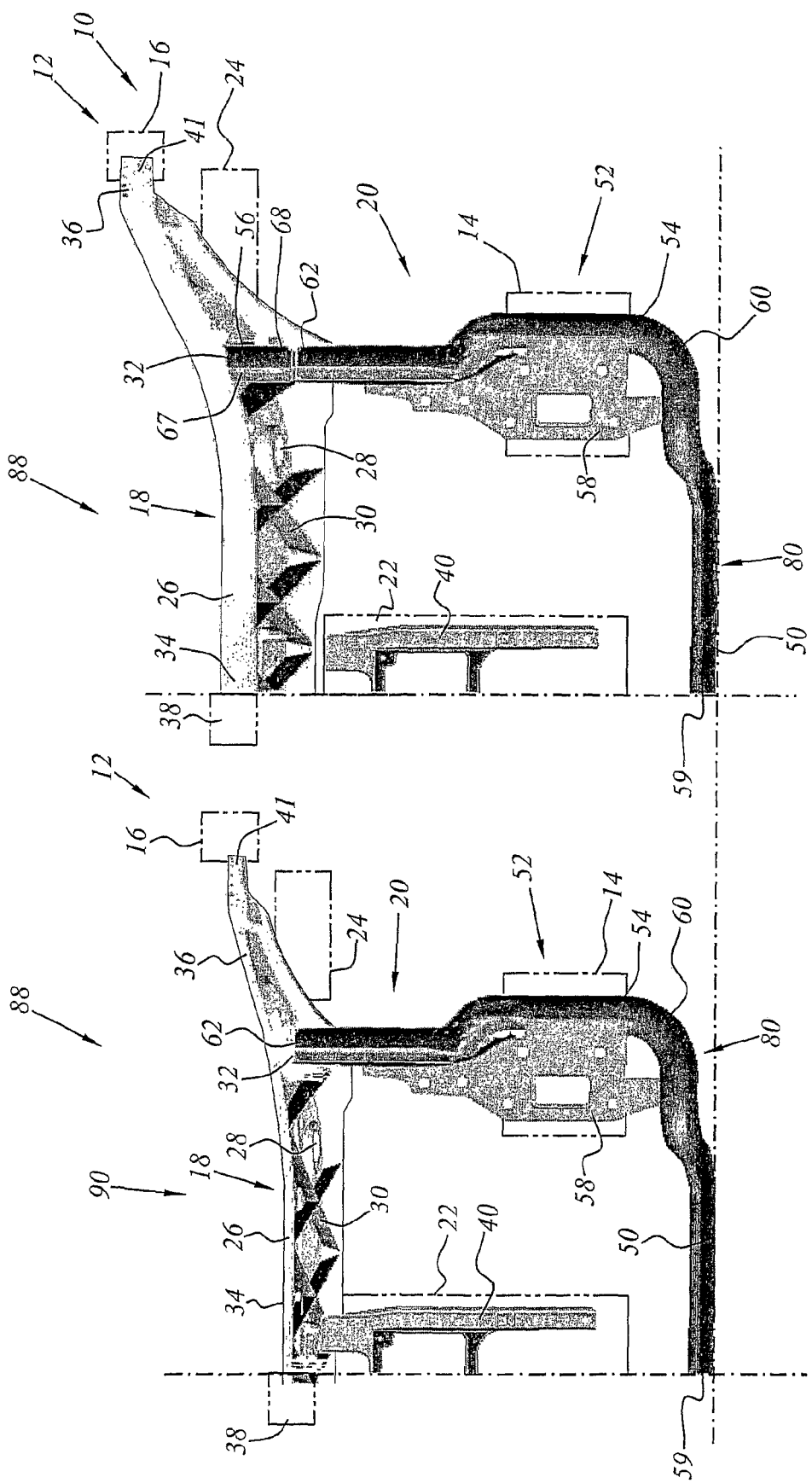
FIG. 1 is a partial front view of a first front-end panel according to the invention.

A first front-end panel 10 according to the invention is shown in FIG. 1. Said front-end panel 10 is fixed transversely to the front of body elements 12 of the vehicle comprising lower side members 14 and upper longitudinal bars 16 for fixing the wings.

The front-end panel 10 comprises an upper cross member 18, a frame 20 for housing equipment and fixed beneath the cross member 18, and equipment comprising a fan 22 and headlights 24 carried by the front-end panel 10.

The upper cross member 18 comprises a horizontal transverse profile 26 delimiting a channel 28 which is downwardly open. The cross member 18 further comprises reinforcing ribs 30 and sleeves 32 for fixing the frame 20 and which are arranged in the channel 28.

The profile 26 has a central region 34 extending against the frame 20 and two lateral extensions 36 which project laterally from the central region 34.

The central region 34 carries a lock 38 for locking the bonnet covering the engine, and a framework 40 for housing the fan.

The lateral projections 36 have a free end 41 fixed to the front of the bars 16 for fixing the wings. The headlights 24 are inserted beneath the lateral extensions 36.

Figure 2:
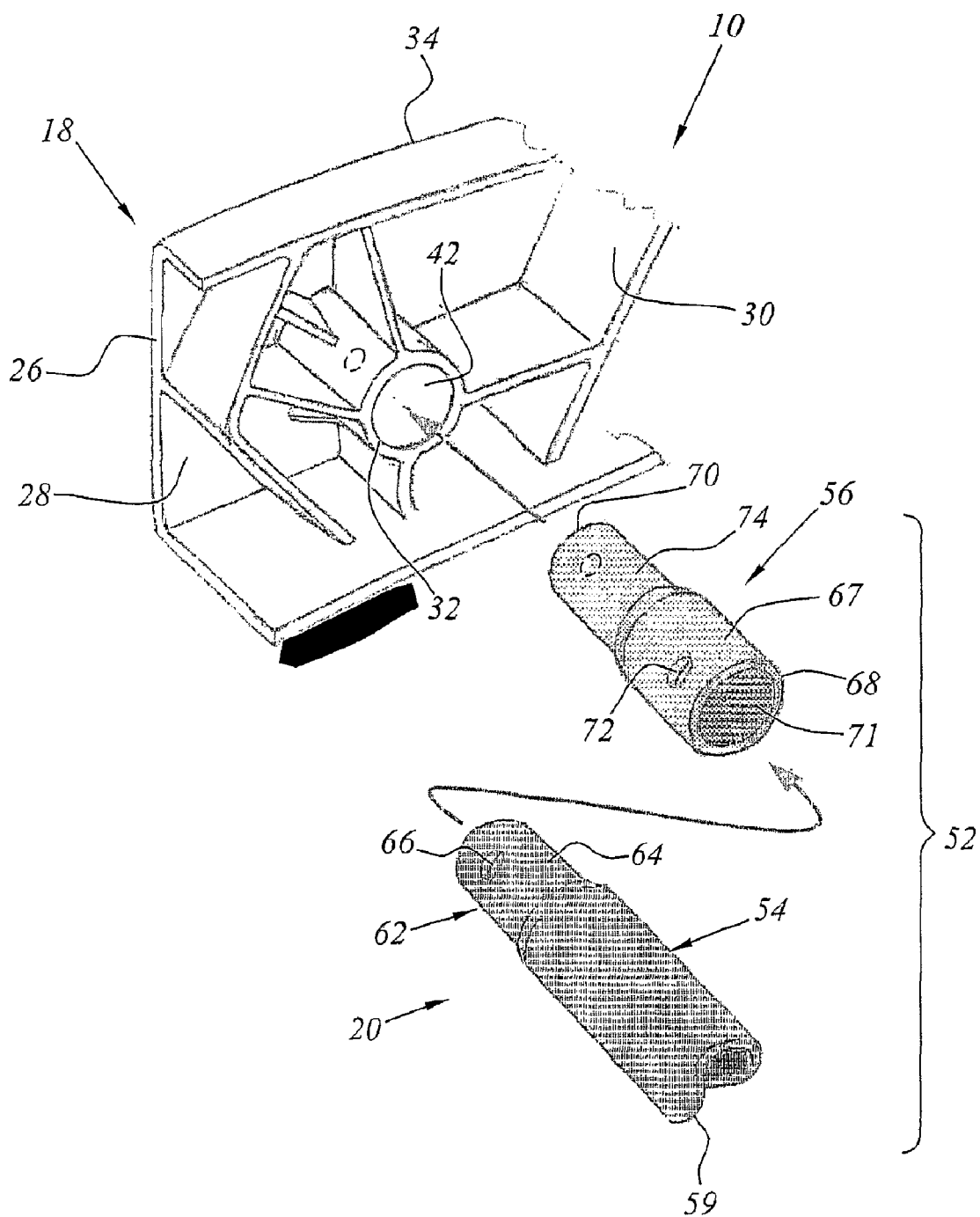
FIG. 2 is a partial exploded perspective view from below of an upper cross member and the upper and lower portions of a strut of the front-end panel of FIG. 1.

As shown in FIG. 2, the ribs 30 delimit a network of cells in the channel 28.

The fixing sleeve 32 is arranged so as to abut the ribs 30. It has a cylindrical recess 42 for receiving the frame and opens downwardly.

As shown in FIGS. 1 and 2, the supporting frame 20 comprises a lower beam 50 and two side struts 52 (right and left) connecting the lower beam 50 to the cross member 18, each strut 52 comprising a lower portion 54 which is integral with the lower beam 50, and an upper portion 56 which is integral with the cross member 18. In order to simplify the drawings, only one strut 52 is shown in FIG. 1.

The frame 20 further comprises, for each strut 52, an end plate 58 to be fixed to the side members 14 which is integral with the strut 52 and the beam 50.

The lower beam 50 and the lower portion 54 are integral. They are made from a hollow metal tubular element 59 defining a bend 60 between the lower beam 50 and the lower portion 54.

In this example, the tubular element 59 has a circular cross section. It is obtained by way of hydroforming. In a variant, the tubular element 59 has a square, oval or other shaped cross-section. The recess 42 is shaped so as to correspond substantially to the shape of the tubular element 59.

The mean cross-section of the tubular element 59 is substantially constant.

The lower beam 50 extends substantially parallel to the cross member 18 between the struts 52. It extends beneath the end plates 58 and beneath the fan 22.

The lower portion 54 of each strut 52 extends substantially vertically between the bend 60 and an upper end 62 to be fitted in the upper portion 56.

The end 60 defines a fitting lug 64 having a horizontal cross-section which is substantially smaller than the mean cross-section of the lower portion 54. The lug 64 delimits a lateral orifice 66 for the insertion of a fixing element.

The upper portion 56 is made from a tubular element 67 having a mean horizontal cross-section substantially equal to the mean horizontal cross-section of the lower portion 54.

It extends between a lower end 68 for receiving the lower portion 54 and an upper end 70 for fixing to the cross member 18.

The height of the upper portion 56, measured between the ends 68 and 70, is less than the height of the lower portion 54. In this example, the upper portion 56 is at least twice as short as the lower portion 54.

The lower end 68 defines a vertical recess 71 for receiving the lug 64 and having a cross-section which complements that of the lug 64.

A lateral orifice 72 for the passage of a fixing element is provided in the tubular element 67. It is arranged so as to face the lateral orifice 66 in the lower portion 54 when the lug 64 is inserted in the recess 71.

The upper end 68 delimits an upper lug 74 to be fixed in the sleeve 32. The lug 74 has a horizontal cross-section which is smaller than the mean cross-section of the upper portion 56. This cross-section substantially complements the inner horizontal cross-section of the recess 42.

According to the invention, the lower portion 54 is mobile relative to the upper portion 56 when assembling the front-end panel 10 between a disassembled configuration shown in FIG. 2 in which the upper portion 56 is arranged at a distance from the lower portion 54, and an assembled configuration in which the lower portion 54 and the upper portion 56 are fitted together.

In the assembled configuration, shown in FIG. 1, the lug 64 of the lower portion 54 has been inserted and is fitted in the recess 71 at the lower end 68 of the upper portion 56. A fixing element may be inserted between the lug 64 and the upper portion 56.

In this example, the upper end 70 of the upper portion 56 is fixed beneath the cross member by press-fitting the upper lug 74 into the passage 62.

In a variant, a screw or a rivet is inserted through the complementary openings formed in the fixing sleeve 32 and in the upper lug 74.

With reference to FIG. 1, the end plates 58 are fixed to the front of the side members 14. A bumper beam (not shown) may be fixed to the front of the end plates 58, with shock absorbers optionally being interposed.

The method for assembling the first front-end panel 10 according to the invention will now be described.

Firstly, a lower framework 80 comprising a lower beam 50 and a lower portion 54 of a strut 52 is provided. As will be seen below, this framework 80 is common to various types of vehicle of the same platform.

Depending on the height of the bonnet on which the vehicle must be assembled, an upper portion 56 having a predetermined height is selected. Each upper portion 56 is force-fitted into a cross member 18 by inserting the lug 74 into the fixing sleeve 32.

For each strut 52, the upper portion 56 is then displaced relative to the lower portion 54 so as to insert the lug 64 of the lower portion 54 into the recess 71.

The lower portion 54 is thus fitted in the upper portion 56 so as to form the strut 52.

The strut 52 is thus sufficiently structurally rigid so as to house motor vehicle equipment, such as the fan 22 or headlights 24 and to ensure that the front-end panel 10 has sufficient mechanical strength in the case of a front-end collision against the vehicle.

Standardising the lower framework 80 which is common to different types of vehicle considerably reduces the cost of the front-end panel 10 whilst also adapting to the varying heights of motor vehicles.

A first series 88 of front-end panels 10, 90 according to the invention may thus be produced at minimal cost. This series comprises a first group of front-end panels 10 which are identical to that shown in FIG. 1 and described above.

A second front-end panel 90 representing a second group of front-end panels of the first series 88 is shown in FIG. 3. This second front-end panel 90 comprises a lower framework 80 which is identical to the lower framework 80 of the front-end panel 10, with lower beams 50 and vertical portions 54 being integral and the same size as the lower beam 50 and the vertical portion 54 of another framework 80.

However, each strut 52 of the second front-end panel 90 is devoid of an upper portion 56.

Consequently, for each second front-end panel 90, each vertical portion 54 of the framework 80 is fixed directly to the cross member 18 by inserting the vertical portion 54 into a fixing sleeve 32 of said cross member 18.

The struts 52 of the front-end panels 90 of the second group of the series are thus formed exclusively by the vertical portions 54.

The height of the second front-end panel 90, measured between the lower beam 50 and the cross member 18, is thus less than the height of each first front-end panel 10 of the first group of the series.

The method for assembling this series of front-end panels thus comprises providing a plurality of identical lower frameworks 80, each framework 80 comprising a lower beam 50 and a lower portion 54 of a strut which is integral with the lower beam 50.

The method then comprises assembling a first group of front-end panels 10, including inserting an upper portion 56 between the cross member 18 and the lower portion 54 by fitting the upper portion 56 to the lower portion 54 as described above and by fixing the upper portion 56 beneath the cross member 18.

The method further comprises assembling a second group of front-end panels 90 by arranging the cross member 18 directly on the lower portion 54 of one of the frameworks 80.

In a variant, each upper portion 56 is fixed to the cross member 18 by moulding the cross member 18 onto said portion 56.

As shown in FIG. 4, a second series 100 of front-end panels 102A, 102B, 102C of varying heights is produced.

In this series, upper portions 56A, 56B, 56C of varying heights are fixed to cross members 18A, 18B, 18C of varying shapes which are each adapted to the body of the vehicle on which the respective front-end panels 102A, 102B, 102C will be assembled.

In this example, the upper portions 56A, 56B, 56C have a lug arranged at their lower end. The lug is to be received in a complementary recess arranged in the upper end of a lower portion of a framework 80.

A plurality of lower identical frameworks 80 is thus produced, in which each framework 80 comprises a lower beam 50 and a lower portion 54. The lower portions 54 are all the same height.

Three types of front-end panel 102A, 102B, 102C of varying heights are assembled by selectively fitting an upper portion 56A, 56B, 56C of predetermined height to the lower portion 54 of a framework 80, depending on the height of the vehicle on which the front-end panel 102A, 102B, 102C will be assembled.

The second series 100 of front-end panels of the invention thus comprises at least two types of front-end panel 102A, 102B, 102C having struts 52 of varying heights but still having lower frameworks 80 of identical structure so as to reduce the cost of each front-end panel by way of standardisation.

The invention claimed is:

1. A series (88; 100) of motor vehicle front-end panels, each front-end panel (10; 90; 102A, 102B, 102C) being of the type comprising:
    an upper transverse cross member (18) to be fixed to body elements (12) of the vehicle;
    a frame (20), the frame (20) being fixed beneath the cross member (18) and comprising a lower transverse beam (50) and two side struts (52) connecting the lower beam (50) to the cross member (18),
wherein the series (88; 100) comprises:
    at least a first front-end panel (10; 102A, 102B, 102C) in which each strut (52) comprises a lower portion (54) which is integral with the beam (50), and an upper portion (56; 56A, 56B; 56C) which is integral with the cross member (18), the upper portion (56; 56A, 56B; 56C) and the lower portion (54) being mobile relative to one another between a disassembled configuration in which the upper portion (56; 56, 56B; 56C) is arranged at a distance from the lower portion (54) and an assembled configuration in which the upper portion (56; 56A, 56B; 56C) and the lower portion (54) are fitted together;
    at least a second front-end panel (90; 102A, 102B, 102C) comprising a lower beam (50) and a lower portion (54) of a strut constructed identically to the lower beam (50) and the lower portion (54) respectively of a strut of the or each first front-end panel (10; 102A, 102B, 102C), the or each second front-end panel (90; 102A, 102B, 102C) comprising a strut (52) which is shorter than the height of the strut (52) of the or each first front-end panel.

2. A series (88) as claimed in claim 1, wherein the upper cross member (18) of the or each second front-end panel (90) is fixed directly to the lower portion (54) so as to form a strut (52) which is shorter than the height of the strut (52) of the or each first front-end panel (10).

3. A series (100) as claimed in claim 1, wherein the or each second front-end panel (102A, 102B, 102C) comprises an upper portion (56A, 56B, 56C) which is integral with the cross member (18), the upper portion (56A, 56B, 56C) and the lower portion (54) being mobile relative to one another between a disassembled configuration in which the upper portion (56A, 56B, 56C) is arranged at a distance from the lower portion (54), and an assembled configuration in which the upper portion (56A, 56B, 56C) and the lower portion (54) are fitted together, the height of the upper portion (56A, 56B, 56C) of the strut of the or each second front-end panel (102A, 102B, 102C) being different to the height of the upper portion (56) of the strut of the or each first front-end panel (102A, 102B, 102C).

4. A series (88, 100) as claimed in claim 3, wherein for each front-end panel (10; 102A, 102B, 102C), the lower portion (54) and upper portion (56; 56A, 56B; 56C) are each made from a tubular element (59, 67).

5. A series (88, 100) as claimed in claim 3, wherein for each front-end panel (10; 102A, 102B, 102C), the lower beam (50) is made from the same tubular element (59) as the lower portion (54), said tubular element (59) being bent between the lower beam (50) and the lower portion (54).

6. A series (88, 100) as claimed in claim 3, wherein for each front-end panel (10; 102A, 102B, 102C), the mean horizontal cross-section of the lower portion (54) is substantially equal to the mean horizontal cross-section of the upper portion (56; 56A, 56B; 56C).

7. A series (88, 100) as claimed in claim 3, wherein for each front-end panel (10; 102A, 102B, 102C), the upper portion (56; 56A, 56B; 56C) is fixed and enclosed in the upper cross member (18).

8. A series (88, 100) as claimed in claim 3, wherein each front-end panel (10; 102A, 102B, 102C) comprises a fixing element inserted through the upper portion (56; 56A, 56B; 56C) and the upper cross member (18).

9. A series (88, 100) as claimed in claim 1, wherein the upper cross member (18) carries at least one element (38) for locking a bonnet.

10. A method for assembling a series (88; 100) of motor vehicle front-end panels, each front-end panel (10; 90; 102A, 102B, 102C) being of the type comprising:
    an upper transverse cross member (18) to be fixed to body elements (12) of the vehicle;
    a frame (20), the frame (20) being fixed beneath the cross member (18) and comprising a lower transverse beam (50) and two side struts (52) connecting the lower beam (50) to the cross member (18),
wherein the method comprises the following steps:
    providing a plurality of identical lower frameworks (80), each framework (80) comprising a lower beam (50) and a lower portion (54) of a strut which is integral with the lower beam (50);
    assembling at least a first front-end panel (10; 102A, 102B, 102C) which comprises providing and displacing an upper portion (56; 56A, 56B; 56C) of a strut relative to the lower portion (54) of one of the identical frameworks (80) between a disassembled configuration in which the upper portion (56; 56A, 56B; 56C) is arranged at a distance from the lower portion (54), and an assembled configuration in which the upper portion (56; 56A, 56B; 56C) and the lower portion (54) are fitted together, and which comprises fixing the upper portion (56; 56A, 56B; 56C) to the cross member (18);
    assembling at least a second front-end panel (90; 102A, 102B, 102C) which comprises using one of the identical lower frameworks (80) to form a strut (52) which is shorter than the height of the strut (52) of the or each first front-end panel (10; 102A, 102B, 102C).

11. A series (88, 100) as claimed in claim 4, wherein for each front-end panel (10; 102A, 102B, 102C), the lower beam (50) is made from the same tubular element (59) as the lower portion (54), said tubular element (59) being bent between the lower beam (50) and the lower portion (54).

12. A series (88, 100) as claimed in claim 4, wherein for each front-end panel (10; 102A, 102B, 102C), the mean horizontal cross-section of the lower portion (54) is substantially equal to the mean horizontal cross-section of the upper portion (56; 56A, 56B; 56C).

13. A series (88, 100) as claimed in claim 5, wherein for each front-end panel (10; 102A, 102B, 102C), the mean horizontal cross-section of the lower portion (54) is substantially equal to the mean horizontal cross-section of the upper portion (56; 56A, 56B; 56C).

14. A series (88, 100) as claimed in claim 4, wherein for each front-end panel (10; 102A, 102B, 102C), the upper portion (56; 56A, 56B; 56C) is fixed and enclosed in the upper cross member (18).

15. A series (88, 100) as claimed in claim 5, wherein for each front-end panel (10; 102A, 102B, 102C), the upper portion (56; 56A, 56B; 56C) is fixed and enclosed in the upper cross member (18).

16. A series (88, 100) as claimed in claim 6, wherein for each front-end panel (10; 102A, 102B, 102C), the upper portion (56; 56A, 56B; 56C) is fixed and enclosed in the upper cross member (18).

17. A series (88, 100) as claimed in claim 4, wherein each front-end panel (10; 102A, 102B, 102C) comprises a fixing element inserted through the upper portion (56; 56A, 56B; 56C) and the upper cross member (18).

18. A series (88, 100) as claimed in claim 5, wherein each front-end panel (10; 102A, 102B, 102C) comprises a fixing element inserted through the upper portion (56; 56A, 56B; 56C) and the upper cross member (18).

19. A series (88, 100) as claimed in claim 6, wherein each front-end panel (10; 102A, 102B, 102C) comprises a fixing element inserted through the upper portion (56; 56A, 56B; 56C) and the upper cross member (18).

20. A series (88, 100) as claimed in claim 7, wherein each front-end panel (10; 102A, 102B, 102C) comprises a fixing element inserted through the upper portion (56; 56A, 56B; 56C) and the upper cross member (18).

* * * * *